A. B. WOODARD.
VULCANIZING APPARATUS FOR DENTISTS.
No. 181,758. Patented Aug. 29, 1876.
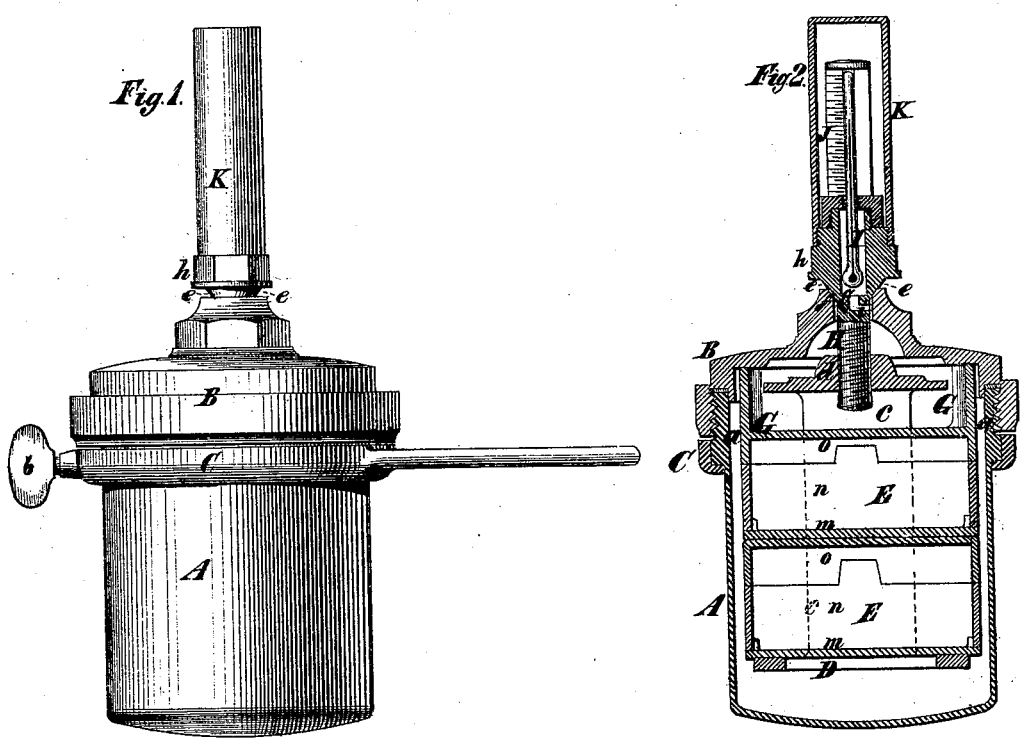

UNITED STATES PATENT OFFICE.

ALONZO B. WOODARD, OF HORNELLSVILLE, ASSIGNOR TO THE BUFFALO DENTAL MANUFACTURING COMPANY, OF BUFFALO, NEW YORK.

IMPROVEMENT IN VULCANIZING APPARATUS FOR DENTISTS.

Specification forming part of Letters Patent No. 181,758, dated August 29, 1876; application filed December 15, 1874.

*To all whom it may concern:*

Be it known that I, ALONZO B. WOODARD, formerly of Alfred Centre, now of Hornellsville, in the State of New York, have invented a new and useful Improvement in Apparatus for Molding and Vulcanizing Dental Plates; and I do hereby declare that the following is a full, clear, and exact description of the same, reference being had to the accompanying drawing, which forms part of this specification.

My present invention relates to an improvement in means for closing the flasks in a dental vulcanizing apparatus; and it consists in the combination, with the steam-generating vessel, of a frame or cage capable of holding one or more flasks, a screw-rod extending into said vessel, and connected to the said cage, the said parts being so arranged relatively to each other that, upon operating the screw-rod from the outside of the vessel when closed, the cage may be drawn upward within said vessel, pressing the flask, containing the materials for the dental plate, against the cover, or some suitable upper portion of the apparatus, thereby closing the flask and molding or forming the dental plate, when the material therefor has become sufficiently softened by the heat applied, whereby a more durable and efficient apparatus may be produced than those in which the flask is closed by direct screw-pressure, which forces the same against the bottom of the vulcanizing-vessel, or by steam-pressure acting upon a cage, to force the flasks against flanges at the upper portion of the vessel.

In the accompanying drawing, Figure 1 is a side view of a vulcanizing apparatus containing my invention, and Fig. 2 is a central vertical section of the same.

A designates the vulcanizing-vessel or steam-generator, made of brass, copper, or other suitable material, and sufficiently strong to resist the steam-pressure to which it may be subjected. In the present instance this vessel is of cylindrical form, and carries at its mouth or top a flange, *a*, which is provided with an external screw-thread, for receiving upon it the internally screw-threaded rim or band of a cover, B; and I have shown said flange *a* as provided with a plain or unthreaded portion, for receiving the ring of a holder or lifter, C, which latter may be secured in place by a set-screw, *b*. D designates a frame or cage, consisting, in the present instance, of an annular or perforated bottom plate and a top plate, connected to said bottom plate by uprights *c c*, which latter are preferably provided with plain or flat inner faces and convex outer sides. The said top plate of the cage is provided with a screw-threaded socket or nut, *d*, for receiving the screw-threaded end of a rod, H, which extends through the cover B of said vessel A, and by means of which the said cage is suspended and operated within the vessel A. E designates a flask, for containing the dental plate or other article to be subjected to the molding process. Such flask, in the example shown, consists of three parts, *m*, *n*, and *o*— *n* being the body portion; *m*, the bottom, having on its upper face studs, which project into the body portion for keeping the said bottom *m* in place; and *o* being the cover, which is held in place by flanges or ears projecting from the edge of the body portion *n*, or vice versa, for keeping the cover in place. This is a convenient method of constructing a flask; but any other construction or style of flask may be used. Two of such flasks are shown in the drawing within the cage D, and they are preferably of a shape corresponding to that of the vessel C. In the present instance they are circular, and have vertical plain surfaces on opposite sides, to enable them to fit between and be steadied by the flat inner faces of the uprights *c c* of the cage D, without in any respect interfering with or hindering their removal at pleasure. The upper part *o* of the upmost flask is shown as provided with two horns or flanges, G G, extending upward one on each side of the top plate of the cage D, so that the upper edges of such horns will bear against the cover of the vessel when the said cage is drawn up. The said screw-rod H may be operated in any suitable manner from the outside of the vessel A. I have shown it as provided at its upper end with a head, *h*, capable of receiving a wrench by which to turn it, and as provided with an inverted conical boss, e, resting in a correspondingly-shaped seat at the top of the opening in the cover, through which the said rod extends. A simple steam-tight joint is thus obtained. I will here remark that it is obvious that the lower end of the rod H may be permanently attached to the cage D, and its upper portion be provided with a screw-thread adapted to work through a nut affixed in or to the cover of the vessel A, or applied to the rod above the cover.

I designates a thermometer, which is attached to the rod H. Connection between the thermometer-bulb and the steam in the vessel A may be effected by a passage, i, leading from the interior of the said vulcanizing-vessel to a cavity in the head of the rod H, where the said thermometer-bulb may be located. The tube of the thermometer, in that case, would be arranged in a graduated frame or plate, J, also attached to the rod H, and the said thermometer may be inclosed or protected by a case, K. The flasks containing the dental plates or other articles to be molded are placed in the cage D. Water is introduced into the vessel A, and its cover B applied. The vessel is then placed in the opening of a stove or over any other suitable heating device.

When the material composing the dental plate is sufficiently soft to be compressed within the flasks, the rod H is operated, and the cage D drawn upward, and the flasks closed by the horn-pieces G G coming in contact with the cover of the vessel A.

It is obvious that the horns G G may be dispensed with, and the vessel A provided with some obstacle against which the flask or flasks may be caused to abut; and it is also obvious that the upper flask may be caused to bear against the bottom of the rod H itself; but in a cylindrical vessel a stop should, in such case, be affixed in some proper place to prevent the rotation of the cage when operating the rod for drawing up the flasks against it.

This invention provides for effectually compressing the flasks by screw-power capable of being operated from the outside of the vessel, wherever sufficient heat has been applied to properly soften the material without exerting any pressure whatsoever on the body portion or shell of the vulcanizing-vessel, and hence such vessel may be made of thin light metal, and, when so made, the apparatus can be placed at a cheaper price in the market, and steam be more quickly generated therein.

The plate, being molded as above described, may, if composed of vulcanizable gum, be vulcanized at a continuous operation, and without changing its position in the vessel A B.

I do not claim a vulcanizer constructed with a movable plate in the interior, on which the flasks rest, said plate being secured to sliding rods passing through stuffing-boxes in the cover, and attached to a cross-bar provided with a screw bearing against the cover, by means of which the plate may be drawn toward the cover, for the purpose of bringing the parts together, as such is not new.

My invention consists, essentially, in an improvement upon such a vulcanizer, whereby the greatest economy in space is secured, the convexity of the outer faces of the upright sides of the clamp in my apparatus corresponding to the radius of the boiler, the flat inner faces of said sides allowing the most material to be used, and consequently securing the greatest strength to the sides that is possible in the small space occupied by the clamp, thus enabling a smaller boiler to be employed, which, together with the simplicity of the clamp, which requires but one opening through which the screw passes, and no stuffing-boxes, renders the construction of the apparatus much less expensive than those heretofore in use.

What I claim as my invention, and desire to secure by Letters Patent, is—

1. The combination of a closed vessel or boiler, a clamp or cage contained therein, and a screw-rod passing from the outside to the interior of the said closed vessel, and engaging by its threaded portion with the said clamp or cage, the whole being so constructed and arranged that the rotation of the screw-rod shall draw the clamp toward it, and close one or more dental flasks contained in, and held by, said cage, by pressing them against the top or some suitable upper portion of the said vessel, substantially as herein set forth.

2. The combination, with the cage D and screw-rod H, of the horns G G, arranged to abut against the cover of the vulcanizing-vessel when the cage is drawn upward by the screw-rod, substantially as and for the purpose herein set forth.

3. The combination of the screw-rod H, provided with an inverted conical boss, e, with the cover B, provided with a conical socket or seat, f, for said boss, substantially as and for the purpose herein set forth.

4. The combination, with the screw-rod H, provided with the passage i and cavity g, of the thermometer I J, substantially as and for the purpose herein set forth.

A. B. WOODARD.

Witnesses:
JOHN E. ROBIE.
Mrs. A. B. WOODARD.